US011390281B2

(12) United States Patent
Barber et al.

(10) Patent No.: US 11,390,281 B2
(45) Date of Patent: Jul. 19, 2022

(54) BRAKE DISTRIBUTION CONTROL FOR COMBINED BRAKE AND PROPULSION MANEUVERS

(71) Applicant: GM GLOBAL TECHNOLOGY OPERATIONS LLC, Detroit, MI (US)

(72) Inventors: Christopher J. Barber, West Bloomfield, MI (US); Stefan M. Frick, West Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 17/061,909

(22) Filed: Oct. 2, 2020

(65) Prior Publication Data

US 2022/0105939 A1 Apr. 7, 2022

(51) Int. Cl.
| | | |
|---|---|---|
| *B60W 30/182* | (2020.01) | |
| *B60W 30/18* | (2012.01) | |
| *B60W 10/184* | (2012.01) | |
| *B60W 10/06* | (2006.01) | |
| *B60W 30/184* | (2012.01) | |

(52) U.S. Cl.
CPC ...... *B60W 30/18009* (2013.01); *B60W 10/06* (2013.01); *B60W 10/184* (2013.01); *B60W 30/182* (2013.01); *B60W 30/184* (2013.01); *B60W 30/18027* (2013.01); *B60W 30/18109* (2013.01); *B60W 2520/10* (2013.01); *B60W 2540/10* (2013.01); *B60W 2540/12* (2013.01); *B60W 2710/0666* (2013.01); *B60W 2710/18* (2013.01)

(58) Field of Classification Search
CPC ........... B60W 30/18027; B60W 10/06; B60W 10/084; B60W 30/182; B60W 2520/10; B60W 2540/10; B60W 2540/12; B60W 2710/0666; B60W 2710/18; B60T 8/26; B60T 8/58; B60T 2250/04
See application file for complete search history.

(56) References Cited

U.S. PATENT DOCUMENTS

| | | | | |
|---|---|---|---|---|
| 2017/0190228 A1* | 7/2017 | Handzel, Jr. | .......... | B60W 30/02 |
| 2017/0232968 A1* | 8/2017 | Wilder | ...................... | B60T 8/26 |
| | | | | 701/70 |
| 2019/0255895 A1* | 8/2019 | Sanborn | .................. | B60T 8/175 |
| 2020/0122534 A1* | 4/2020 | Glugla | .................... | B60T 8/175 |

FOREIGN PATENT DOCUMENTS

GB 2580391 A * 7/2020 .......... B60W 30/182

* cited by examiner

*Primary Examiner* — Roger L Pang
(74) *Attorney, Agent, or Firm* — Cantor Colburn LLP (57) ABSTRACT

A system for monitoring and controlling vehicle operation includes a monitoring unit disposed at a vehicle, the vehicle including rear brakes and front brakes, the monitoring unit configured to monitor driver inputs, and automatically detect a driver's intention to perform a combined brake and propulsion maneuver based on the driver inputs meeting a first set of conditions. The system also includes a control unit configured to receive a brake request and an engine torque request from the driver during the maneuver, and based on detecting the first set of conditions, apply a front braking force via the front brakes according to the brake request, and automatically control a rear braking force applied by the rear brakes during the maneuver, so that the rear braking force is less than the front braking force.

20 Claims, 4 Drawing Sheets

BRAKE DISTRIBUTION CONTROL FOR COMBINED BRAKE AND PROPULSION MANEUVERS

INTRODUCTION

The subject disclosure relates to control of brake pressure distribution.

Combined brake and propulsion maneuvers, including so-called "brake-stands" or "burn-outs," can be executed by drivers in various contexts. For example, competitive drivers such as drag racers often perform such maneuvers to warm up the driven tires. In addition, drivers may desire to perform such maneuvers for recreation or exhibition purposes. There is a potential for vehicle damage, such as transmission or driveline damage, due to the potentially excessive heat and torque that can arise. Accordingly, it is desirable to provide a system that can allow a user to execute a combined brake and propulsion maneuver while protecting against vehicle damage and maintaining adequate control over a vehicle.

SUMMARY

In one exemplary embodiment, a system for monitoring and controlling vehicle operation includes a monitoring unit disposed at a vehicle, the vehicle including rear brakes and front brakes, the monitoring unit configured to monitor driver inputs, and automatically detect a driver's intention to perform a combined brake and propulsion maneuver based on the driver inputs meeting a first set of conditions. The system also includes a control unit configured to receive a brake request and an engine torque request from the driver during the maneuver, and based on detecting the first set of conditions, apply a front braking force via the front brakes according to the brake request, and automatically control a rear braking force applied by the rear brakes during the maneuver, so that the rear braking force is less than the front braking force.

In addition to one or more of the features described herein, the first set of conditions includes at least one of: the vehicle speed being below a selected speed threshold, and the driver inputs include engagement of a brake pedal and an accelerator pedal in a selected sequence.

In addition to one or more of the features described herein, the control unit is configured to maintain the front braking force at a level corresponding to a brake request from the driver inputs, and maintain the rear braking force at zero or within a selected range from zero.

In addition to one or more of the features described herein, the control unit is configured to monitor the driver inputs during the maneuver, and compare the driver inputs to a second set of conditions corresponding to the driver's intention to end the maneuver.

In addition to one or more of the features described herein, the control unit is configured to return the vehicle to a previous operating mode based on the driver inputs meeting the second set of conditions.

In addition to one or more of the features described herein, the control unit is configured to monitor the driver inputs and vehicle conditions during the maneuver, and compare the driver inputs and the vehicle conditions to a set of entry conditions, the entry conditions indicative of an unsafe condition of the vehicle.

In addition to one or more of the features described herein, the set of entry conditions includes a speed of the vehicle being greater than a selected threshold.

In addition to one or more of the features described herein, the control unit is configured to, based on the driver inputs and the vehicle conditions meeting the entry conditions, return braking force to the rear brakes, and limit engine torque to a level below a requested engine torque.

In one exemplary embodiment, a method of monitoring and controlling vehicle operation includes monitoring driver inputs to a vehicle, the vehicle including rear brakes and front brakes, and automatically detecting a driver's intention to perform a combined brake and propulsion maneuver based on the driver inputs meeting a first set of conditions. The method also includes receiving a brake request and an engine torque request from the driver during the maneuver, and based on detecting the first set of conditions, applying a front braking force via the front brakes according to the brake request, and automatically controlling a rear braking force applied by the rear brakes during the maneuver, so that the rear braking force is less than the front braking force.

In addition to one or more of the features described herein, the first set of conditions includes at least one of a vehicle speed being below a selected speed threshold, and the driver inputs include engagement of a brake pedal and an accelerator pedal in a selected sequence.

In addition to one or more of the features described herein, the controlling includes maintaining the front braking force at a level corresponding to a brake request from the driver inputs, and maintaining the rear braking force at zero or within a selected range from zero.

In addition to one or more of the features described herein, the method further includes monitoring the driver inputs during the maneuver, comparing the driver inputs to a second set of conditions corresponding to the driver's intention to end the maneuver, and returning the vehicle to a previous operating mode based on the driver inputs meeting the second set of conditions.

In addition to one or more of the features described herein, the method further includes monitoring the driver inputs and vehicle conditions during the maneuver, and comparing the driver inputs and the vehicle conditions to a set of entry conditions, the entry conditions indicative of an unsafe condition of the vehicle.

In addition to one or more of the features described herein, the method further includes, based on the driver inputs and the vehicle conditions meeting the entry conditions, returning braking force to the rear brakes, and limiting engine torque to a level below a requested engine torque.

In one exemplary embodiment, a vehicle system includes a memory having computer readable instructions, and a processing device for executing the computer readable instructions, the computer readable instructions controlling the processing device to monitoring driver inputs to a vehicle, the vehicle including rear brakes and front brakes, and automatically detect a driver's intention to perform a combined brake and propulsion maneuver based on the driver inputs meeting a first set of conditions. The instructions also control the processing device to receive a brake request and an engine torque request from the driver during the maneuver, and based on detecting the first set of conditions, apply a front braking force via the front brakes according to the brake request, and automatically control a rear braking force applied by the rear brakes during the maneuver, so that the rear braking force is less than the front braking force.

In addition to one or more of the features described herein, the first set of conditions includes at least one of a vehicle speed being below a selected speed threshold, and the driver inputs include engagement of a brake pedal and an accelerator pedal in a selected sequence.

In addition to one or more of the features described herein, the controlling includes maintaining the front braking force at a level corresponding to a brake request from the driver inputs, and maintaining the rear braking force at zero or within a selected range from zero.

In addition to one or more of the features described herein, the processing device is further configured to perform monitoring the driver inputs during the maneuver, comparing the driver inputs to a second set of conditions corresponding to the driver's intention to end the maneuver, and returning the vehicle to a previous operating mode based on the driver inputs meeting the second set of conditions.

In addition to one or more of the features described herein, the processing device is further configured to perform monitoring the driver inputs and vehicle conditions during the maneuver, and comparing the driver inputs and the vehicle conditions to a set of entry conditions, the entry conditions indicative of an unsafe condition of the vehicle.

In addition to one or more of the features described herein, the processing device is further configured to perform, based on the driver inputs and the vehicle conditions meeting the entry conditions, returning braking force to the rear brakes, and limiting engine torque to a level below a requested engine torque.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Devices, systems and methods are provided for detection of a driver's intention to engage in a combined brake and propulsion maneuver (e.g., a brake stand or burn-out, a donut, etc.), and for automatic vehicle control during the maneuver. An embodiment of a control system includes a processing device (e.g., a vehicle processor such as a braking control module) configured to monitor vehicle operations and driver inputs, and detect whether a driver intends to perform a combined brake and propulsion maneuver. For example, the system is configured to detect a first set of conditions (also referred to as "entry conditions") that corresponds to the driver's intention to perform the maneuver based on driver inputs (e.g., the driver's request for engine torque (engage throttle) and braking (engage brake pedal)).

Based on detecting the first set of conditions, the processing device enters a biasing mode in which the processing device allows direct control over drive torque and front braking (via respective pedals), while reducing or eliminating rear brake torque. In other words, the processing device reduces the rear brake torque to a level below that which would be applied in response to the driver's brake torque request, while providing the full amount of front brake torque requested by the driver. This gives the driver direct control of drive slip using the accelerator pedal and improved control of vehicle motion using the brake pedal during a combined brake and propulsion maneuver.

During the maneuver, the processing device monitors driver inputs to detect a second set of conditions (also referred to as "exit conditions") corresponding to the driver's intention to end the maneuver, corresponding to detection or onset of an unsafe condition, and/or corresponding to detection of a potentially unsafe condition (to maintain adequate control of the vehicle if the vehicle is in or approaching an unsafe condition). When the second set of conditions is met, processing device returns the vehicle to normal operation, a previous operating mode, or enters some other operating mode.

In one embodiment, the processing device is configured to perform a two-stage process, which includes a first stage during which the biasing mode is active and rear brake torque is reduced or eliminated. In the second stage, rear braking is reintroduced or increased to normal, but engine torque is reduced (to a level below that requested by the driver). The second stage maintains vehicle safety while still preventing driveline damage when driver continues aggressive burnout inputs or conditions exist (e.g., excessive speed) that could compromise safety.

Embodiments described herein present numerous advantages and technical effects. For example, the embodiments reduce or eliminate the risk of over-loading driveline components and/or other vehicle components by controlling brake distribution to reduce opposing forces applied to a driven axle. The embodiments provide protection from over-loading, while preserving driver control of a vehicle during a maneuver, by allowing the driver control over the drive torque and brake torque via the respective pedals. This gives the driver direct control of drive slip using the accelerator pedal and improved control of vehicle motion using the brake pedal. Embodiments are applicable to any type of vehicle capable of performing maneuvers, including automatic transmission vehicles, manual transmission vehicles, dual clutch transmission vehicles, passenger cars, high-performance vehicles, etc.

In addition, the embodiments provide for automatic protection of vehicle hardware while avoiding the need for a driver to actively select certain operating modes prior to execution of a combined propulsion and braking maneuver. The embodiments are thus advantageous over other systems and features designed to mitigate damage, which typically require that a driver manually activate such features. For example, a "Line Lock" feature isolates brake pressure to the non-driven axle to arrest vehicle motion while allowing driven axle tire slip. Line Lock is a driver selectable feature that requires a driver to actively enter the Line Lock mode and set the brakes prior to executing a maneuver. Also, the availability of the selectable Line Lock feature does not prevent a driver from attempting this maneuver outside of that specific mode, thus the need for additional hardware protection logic separate from the Line Lock feature.

Embodiments described herein provide the ability for a processor to automatically identify the driver's intent of executing a burnout/brake-stand maneuver while minimizing or reducing user interaction with the vehicle system. Embodiments also enhance the ability of a vehicle system to respond to a user initiating a combined brake and propulsion maneuver, and enhance safety during such a maneuver.

Figure 1:
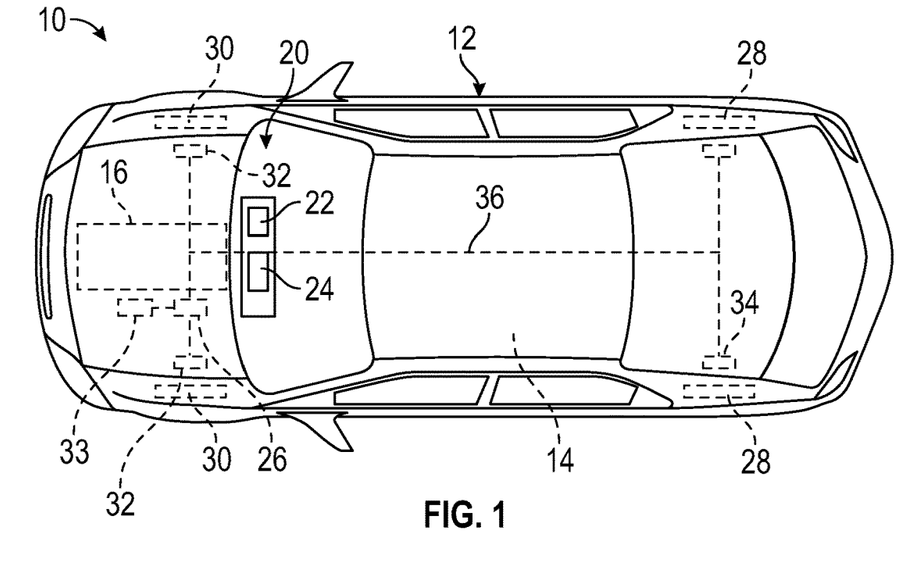
FIG. 1 is a top view of a motor vehicle including various processing devices, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 also includes one or more on-board processing devices and/or systems. For example, the vehicle 10 includes a computer system 20 that includes one or more processing devices 22 and a user interface 24. The vehicle 10 may also include additional processing devices for control of various subsystems. For example, an electronic brake control module (ECBM) 26 is part of the braking subsystem, and controls or regulates operation of the vehicle's rear brakes 28 and front brakes 30. The ECBM 26 may communicate with front brake control units 32 and rear brake control units 34. The various processing devices and units may communicate with one another via a communication device or system, such as a controller area network (CAN) bus 36.

The vehicle may also include a traction control system, whose functionality may be embedded within the ECBM 26, or may be included as a traction control module 33. The ECBM 26 (or other suitable module or vehicle subsystem) may include various control features, such as a Line Lock feature, which is a driver selectable mode that must be initiated by a driver prior to starting a combined brake and propulsion maneuver. The Line Lock feature is typically designed for usage at a dragstrip track. Another feature is a Drivetrain Over-Torque Protection (DOTP) feature, which is a protection algorithm in transmission control software that limits drive torque when approaching inputs that are determined to cause driveline damage. The DOTP feature can provide hardware protection, but does not allow the driver full control of the vehicle because the system reduces drive torque below a driver request. None of the above features provide the advantages of embodiments described herein.

Figure 2:
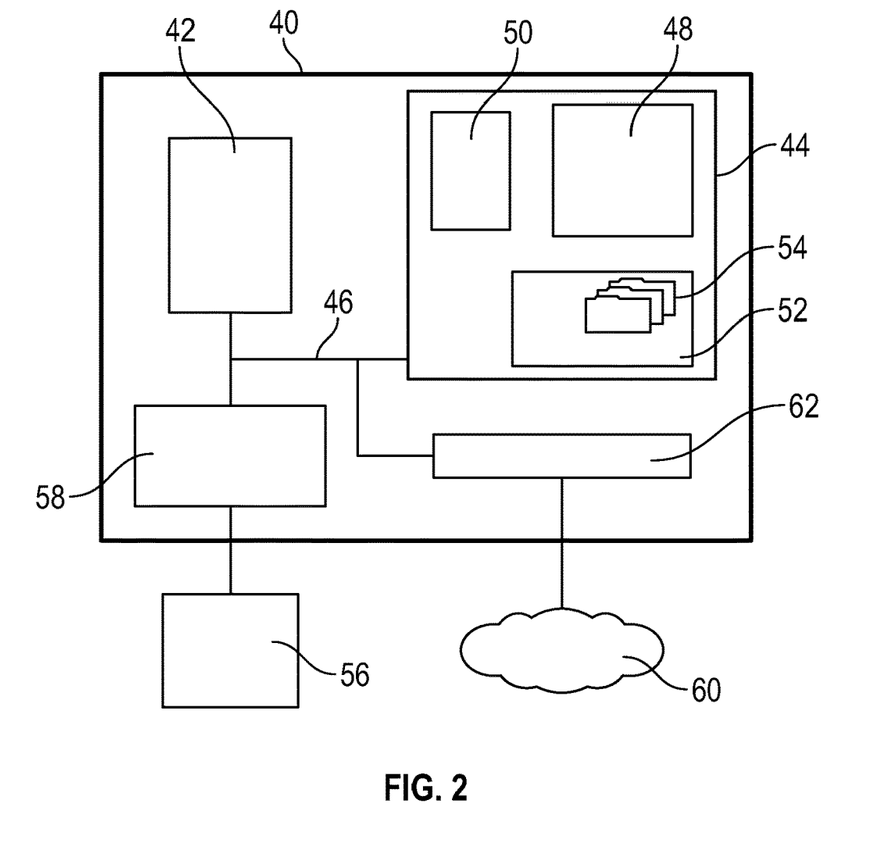
FIG. 2 depicts a computer system, in accordance with an exemplary embodiment.

FIG. 2 illustrates aspects of an embodiment of a computer system 40 that can perform various aspects of embodiments described herein. The computer system includes at least one processing device, which generally includes one or more processors for performing aspects of monitoring and control methods described herein. The processing device can be integrated into the vehicle 10, for example, as an onboard processor such as the one or more processing devices 22, and/or can be a subsystem processing device such as the ECBM 26 or traction control module 33. The computer system may include multiple processing devices that operate in conjunction. For example, aspects of methods described herein can be performed by the ECBM 26 in cooperation with other vehicle subsystems, such as the traction control module 33, engine control units (ECU) and/or a transmission control system.

Referring to FIG. 2, the computer system 40 includes a processing device 42 (such as one or more processors or processing units), a system memory 44, and a bus 46 that couples various system components including the system memory 44 to the processing device 42. The system memory 44 may include a variety of computer system readable media. Such media can be any available media that is accessible by the processing device 42, and includes both volatile and non-volatile media, removable and non-removable media.

For example, the system memory 44 includes a storage system 48 for reading from and writing to a non-removable, non-volatile memory (e.g., a hard drive). The system memory 44 may also include volatile memory 50, such as random access memory (RAM) and/or cache memory. The vehicle processing system 40 can further include other removable/non-removable, volatile/non-volatile computer system storage media.

The system memory 44 includes at least one program product having a set (e.g., at least one) of program modules that are configured to carry out functions of the embodiments described herein. For example, the system memory 44 stores a program 52 or set of programs, and/or various processing modules 54. At least one processing module may be configured to execute one or more control algorithms for performing the methods described herein. For example, the processing modules 54 can include modules for performing various functions, such as acquiring detection or monitoring data, identifying a driver's intentions, controlling braking and/or engine torque during a maneuver, identifying entry and exit conditions, controlling and/or communicating with other devices, and/or controlling other aspects of vehicle operation. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 40 can also communicate with one or more external devices 56, such as vehicle components and other control units in the vehicle 10. Communication with various devices can occur via Input/Output (I/O) interfaces 58.

The processing device 40 may also communicate with one or more networks 60 such as a local area network (LAN), a CAN network, a wide area network (WAN), and/or a public network (e.g., the Internet) via a network adapter 62. It should be understood that although not shown, other hardware and/or software components could be used in conjunction with the computing system 40. Examples include, but are not limited to: microcode, device drivers, redundant processing units, external disk drive arrays, RAID systems, and data archival storage systems, etc.

Figure 3:
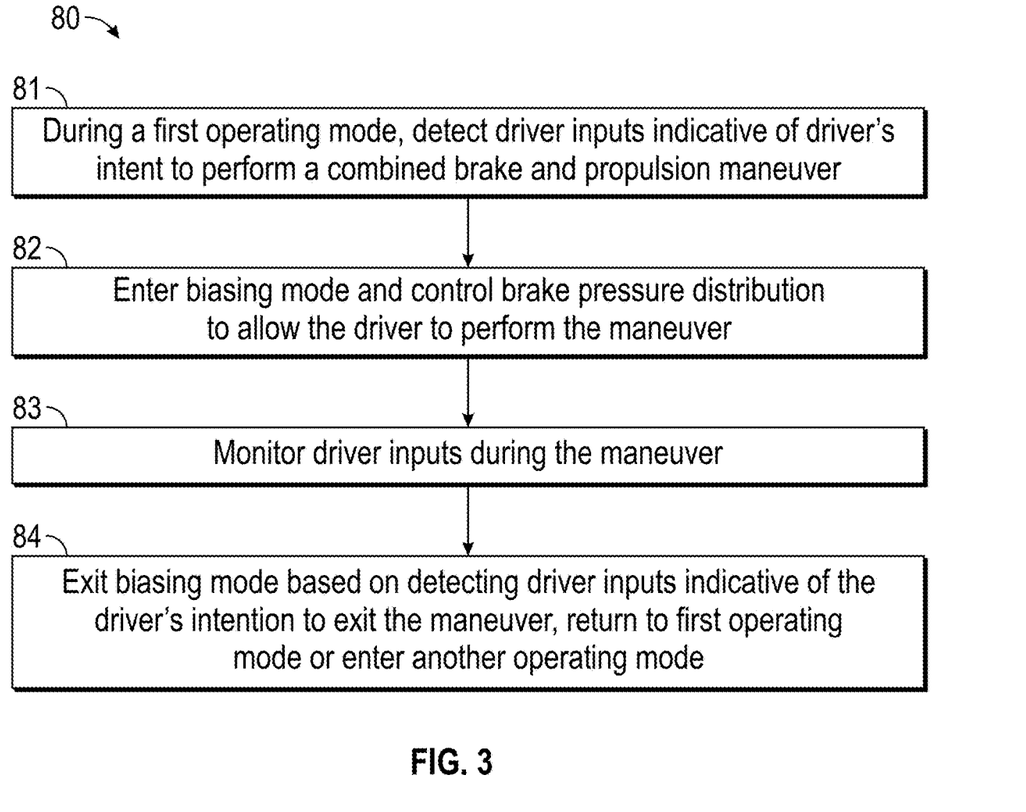
FIG. 3 is a flow diagram depicting aspects of a method of monitoring a vehicle and controlling operation of a vehicle during a combined brake and propulsion maneuver.

FIG. 3 illustrates embodiments of a method 80 of monitoring a vehicle and controlling operation of a vehicle during a combined brake and propulsion maneuver. The method 80 may be performed by a processor or processors disposed in a vehicle (e.g., as an ECU or on-board computer, and/or an EBCM). The method 80 is discussed in conjunction with blocks 81-84. The method 80 is not limited to the number or order of steps therein, as some steps represented by blocks 81-84 may be performed in a different order than that described below, or fewer than all of the steps may be performed.

The method 80 is discussed in conjunction with the vehicle of FIG. 1 and a processing device, which may be, for example, the computer system 40, the on-board processor 22, the ECBM 26, or a combination thereof. It is noted that aspects of the method 80 may be performed by any suitable processing device or system, or combination of processing devices.

At block 81, the processing device monitors vehicle operation and driver inputs. The driver inputs include, for example, engine torque requests and brake requests. An engine torque request is made by the driver by depressing an accelerator pedal (throttle), and a brake request is made by the driver by depressing a brake pedal. Other driver inputs include, for example, engagement of a clutch (in manual transmissions), selection of a transmission gear, and turning on or turning off a vehicle sub-system (e.g., traction control).

The processor monitors driver inputs to detect a set of driver inputs that has the potential to cause damage to vehicle driveline, drivetrain and/or other hardware. In one embodiment, the set of driver inputs is that associated with the driver intending to perform a combined brake and propulsion maneuver, such as a brake-stand or burn-out maneuver.

In one embodiment, the processor is configured to detect driver inputs, and other operating conditions such as vehicle conditions (e.g., speed, engine torque, RPM, gear, etc.) and driving modes (e.g., a normal mode, a performance mode, etc.). The detected inputs and conditions are acquired as detection data, and the detection data is compared to a first set of reference conditions. The first set of reference conditions includes reference values of various driver inputs, reference values of vehicle conditions, and reference driving modes. This set of reference conditions are referred to as "entry conditions."

For example, the entry conditions include a simultaneous request for engine torque and braking (i.e., the driver is simultaneously engaging the brake pedal and the throttle), and/or a selected temporal sequence of inputs. For example, if the vehicle has a manual transmission, the set of inputs can include engaging a clutch and putting the vehicle into gear, engaging a throttle and the clutch at the same time, and/or releasing the clutch and engaging the brake pedal within a selected time period.

At block 82, if the entry conditions are met, the processing device enters a biasing mode. During the biasing mode, the front and rear brake pressure is controlled to reduce or eliminate the risk of over-loading driveline components, e.g., by reducing opposing forces applied to the driven axle (i.e., the front axle). The processing device may actively divert brake pressure from the driven axle (the rear axle in the case of a rear wheel drive vehicle) to the non-driven axle (the front axle).

In one embodiment, during the biasing mode, the processing device limits the rear brake torque or removes the rear brake torque, while allowing front brake torque to be applied by the driver. This allows the rear wheels to spin as engine torque is maintained, while maintaining the driver's ability to control the front brakes with the brake pedal.

At block 83, the processing device monitors driver inputs and operating conditions during the maneuver. The processing device monitors the driver inputs and detects when the driver intends to end the maneuver by comparing detected driver inputs to a second set of reference conditions, referred to as "exit conditions." The exit conditions include, for example, detected inputs in which the brake pedal is released, the throttle is released (or engine torque is reduced below a threshold) or a combination thereof.

At block 84, when the processing device detects the driver's intention to end the maneuver, the processing device exits the biasing mode, and returns the vehicle to a previous driving mode or other operating mode. For example, when the exit conditions are met, the processing device restores full control of the rear brakes and engine torque to the driver.

As discussed in more detail below, in one embodiment, the biasing mode includes two stages. A first stage of the biasing mode (also referred to as "Stage 1") provides vehicle control as discussed at blocks 82 and 83. When the exit conditions for the first stage are met, the processing device may further monitor operating conditions to determine whether conditions meet a second set of entry conditions ("Stage 2 entry conditions"). The Stage 2 entry conditions are selected to be indicative of an unsafe or potentially unsafe condition (e.g., the vehicle exceeds a threshold speed). During Stage 2, the processing device restores braking to the rear brakes, but may limit or reduce engine torque to compensate for excessive speed or other unsafe conditions in order to maintain safe vehicle operation.

Figure 4:
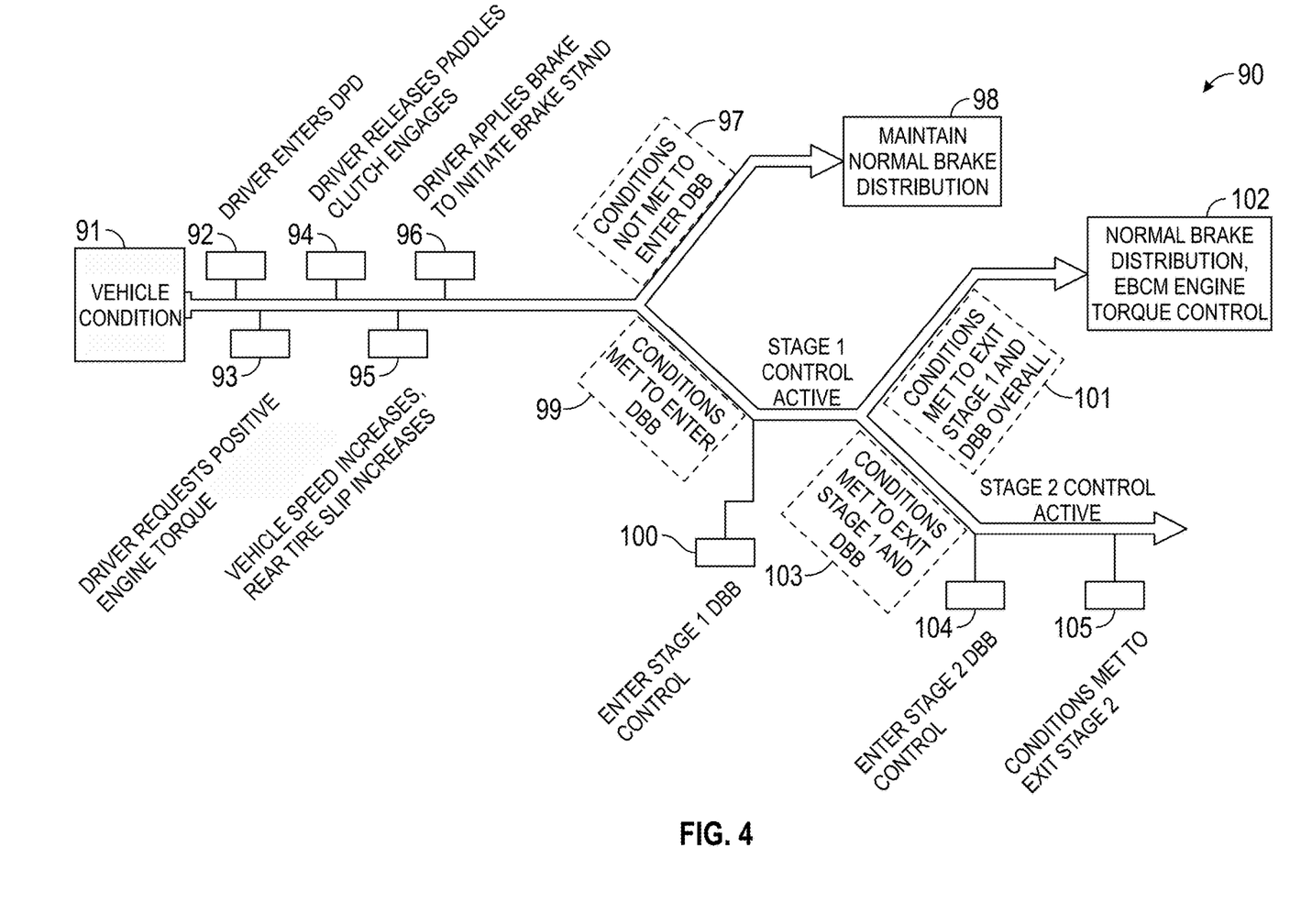
FIG. 4 is a timeline diagram depicting an example of the method of FIG. 3, in accordance with an exemplary embodiment.

FIG. 4 is a timeline diagram that represents an embodiment of a method 90 of monitoring a vehicle and controlling operation of a vehicle during a combined brake and propulsion maneuver. The method 90 may be considered an example of the method 80. In this embodiment, the processing device is described as the ECBM 26 of FIG. 1, but is not so limited.

The timeline diagram illustrates a temporal sequence of steps represented by blocks 91-105. It is noted that FIG. 4 is not intended to be limiting, as one or more of the steps performed according to the blocks 91-105 may be performed in a different order than shown. In addition, fewer than all of the steps may be performed. For example, the method 90 may include only Stage 1 of the biasing mode, or may include both Stage 1 and Stage 2 of the biasing mode.

At block 91, the ECBM 26 monitors vehicle operating conditions to determine whether the operating conditions match a set of initial conditions. An example of the initial conditions is that the vehicle is running and stationary (or moving below a threshold speed).

A driver performs a sequence of actions by applying a set of inputs in order to initiate a combined brake and propulsion maneuver. An example of such a sequence is described in conjunction with blocks 92-96 for illustrative purposes; however, the method 90 is not so limited.

At block 92, the driver enters a neutral state (e.g., by engaging a clutch pedal). If the vehicle includes steering wheel mounted clutch paddle shifters (also referred to simply as paddles), the driver can enter the neutral state by performing a "double paddle declutch," in which the driver simultaneously pulls both of the paddles. The transmission will enter a neutral state for as long as the driver continues to hold the paddles. The driver can use the double paddle declutch technique as a method for initiating a burnout by revving up the engine while in the neutral state and then releasing both paddles simultaneously to trigger an aggressive clutch engagement to get the driven tires spinning.

At block 93, the driver enters a positive engine torque request by engaging and pressing the vehicle's accelerator pedal while in the neutral state. At block 94, the driver releases the vehicle's clutch pedal or clutch paddle(s) and engages the clutch. If the driver performed a double paddle declutch, the driver can release both paddles simultaneously to trigger an aggressive clutch engagement.

At this point, the vehicle speed increases and rear tire slip increases (block 95). At block 96, the driver subsequently requests brake torque by applying pressure to the brake pedal to initiate a brake stand.

As noted above, the sequence of blocks 92-96 is one example of a set of driver inputs associated with the driver's intention to initiate a combined brake and propulsion maneuver, as other driver inputs or sequences of actions can be associated with the driver's intention to initiate the maneuver. For example, in some conditions, a driver may be able to initiate the maneuver by simply applying the accelerator pedal in a quick manner while the clutch or paddles are engaged. In another example, the driver signals an intent to initiate the maneuver by simultaneously engaging the brake and accelerator pedals, or by applying the brake pedal and applying the accelerator thereafter (within a selected time period).

The ECBM 26 monitors vehicle operation to determine whether a set of inputs or conditions are met to initiate Stage 1 and enter the biasing mode. The Stage 1 entry conditions are correlated with the onset of a combined braking and propulsion maneuver, and so that the driver's intention is properly identified, without compromising or interfering with other functions independent of the maneuver.

For example, in order to meet the Stage 1 entry conditions, the vehicle should be in a selected operating mode. For example, one Stage 1 entry condition is that selected brake control systems that would interfere with the maneuver are inactive, such as a traction control system (TCS).

The Stage 1 entry conditions may also include selected vehicle conditions. For example, the Stage 1 entry conditions include the vehicle speed being below a threshold, the gear state being below a selected gear state (e.g., the gear state is below third gear), lateral acceleration being less than a selected amount, and features such as Line Lock are inactive.

The Stage 1 entry conditions may also include reference values of driver inputs. For example, the Stage 1 entry conditions include that brake pedal travel is above a selected amount (indicating that the driver has depressed the brake pedal to a selected extent). For example, this entry condition is met if brake pedal travel from an un-engaged position is at least 20% of the total travel distance of the brake pedal. Similarly, the Stage 1 entry conditions may include that the throttle pedal travel is above a selected amount (e.g. 30%), the primary axle torque is above a calibrated amount (e.g. 3,000 Nm), and rear tire slip is above an amount (e.g. 10% as calculated by taking the ratio of driven wheel speed to non-driven wheel speed).

The Stage 1 entry conditions may include all of the above conditions, or a subset of the above conditions. In addition, other entry conditions may be selected as desired to provide for effective identification of driver intent.

At block 97, if the Stage 1 entry conditions are not met, the ECBM 26 maintains normal brake distribution (block 98).

At block 99, if the detected operating conditions (vehicle conditions and driver inputs) meets the Stage 1 entry conditions, the ECBM 26 enters the biasing mode, referred to as a Dynamic Brake Biasing (DBB) mode (block 100).

During the DBB mode, the ECBM 26 controls the rear brakes in order to remove any brake torque on the rear brakes, or to maintain the rear brake torque below a selected threshold. Also during the DBB mode, the ECBM 26 monitors operating conditions to determine when to exit the DBB mode.

The ECBM 26 controls the rear brakes by communicating with front and rear brake control units (e.g., via a CAN bus). For example, the ECBM 26 receives a brake request from the driver. Under normal operation, the ECBM 26 would send a portion of the request to the front and rear (biasing). In the DBB mode, the normal rear portion is subtracted from the total request, and the difference is transmitted to the front brakes. Alternatively, in the DBB mode, the total unbiased request is simply transmitted to the front brakes.

At block 101, when operating conditions meet a set of exit conditions (Stage 1 exit conditions), the ECBM 26 exits the DBB mode and reinstates normal brake distribution (block 102).

The Stage 1 exit conditions are based on detecting vehicle conditions and/or driver inputs indicative of the driver's intent to end the combined brake and propulsion maneuver. Examples of Stage 1 exit conditions include driver inputs, such as: brake pedal travel less is than a selected amount, throttle pedal travel less than a selected amount, throttle pedal release rate is above a selected amount, and the clutch is disengaged.

During Stage 1, the ECBM 26 monitors the vehicle to determine whether operating conditions meet entry conditions for Stage 2. If Stage 2 entry conditions are met, the ECBM 26 enters Stage 2, in which rear brake pressure is re-introduced, but an engine torque reduction is requested. The intent of the second stage is to maintain vehicle safety (while still preventing driveline damage) when a driver continues aggressive burnout inputs at higher vehicles speeds or otherwise puts the vehicle in an unsafe condition. The second stage enhances safety by limiting vehicle speed during the maneuver.

Referring again to FIG. 4, if the Stage 1 exit conditions are met, the ECBM 26 determines whether entry conditions are met to enter Stage 2 (block 103). If the Stage 2 entry conditions are met (e.g., vehicle speed is above a threshold), the ECBM 26 enters Stage 2 at block 104.

At block 105, when Stage 2 exit conditions are met, the ECBM 26 exits Stage 2 and restores normal engine and brake control.

The following is an example of a set of conditions under which a processing device enters the first stage (Stage 1). It is noted that this example is not intended to be limiting, as the set of conditions can be any number and combination of conditions indicative of a driver's intent to perform the maneuver. In the following, the value CAL is a selected threshold, selected value or range of values calibrated based on knowledge of conditions needed to successfully execute the maneuver. The value CAL is specific to each condition, and thus the value CAL may be different for each condition. In this example, the processing device enters the first stage if the following conditions are met:

Vehicle Mode: =TCS OFF (EBCM State 1)
   OR TCS/ESC OFF (EBCM State 2)
Vehicle Conditions: AND Vehicle Speed<CAL
   AND Gear State<CAL
   AND Lateral Acceleration<CAL
   AND Line Lock=FALSE
Driver Inputs: AND Brake Pedal>CAL
   AND Throttle Pedal>CAL
   AND Primary Axle Torque>CAL
   AND Rear Tire Slip>CAL.

In the above, TCS is a vehicle traction control system, ESC is an electronic stability control system. "Gear state" refers to the gear number currently engaged, "Brake Pedal"

refers to an amount of brake pedal travel, and "Throttle Pedal" refers to an amount of travel of the vehicle's accelerator pedal.

The following is an example of a set of exit conditions for Stage 1. It is noted that this example is not intended to be limiting, as the exit conditions can be any number and combination of conditions indicative of a driver's intent to end the maneuver, or indicative of unsafe or potentially unsafe conditions (e.g., excessive vehicle speed and/or lateral acceleration). In this example, the processing device exits Stage 1 if the following conditions are met:

Driver Inputs to Exit: =Brake Pedal<CAL
 OR Throttle Pedal<CAL
 OR Throttle Pedal Release Rate>CAL
 OR Double Paddle Declutch=TRUE
 OR ETRS=Park/Neutral/Reverse
Vehicle Conditions to Exit: OR ESC=Active (in mode TCS OFF (EBCM State 1))
 OR Lateral Acceleration>CAL
 OR Vehicle Speed>CAL→Criteria to Enter Stage 2
 OR Gear State>CAL→Criteria to Enter Stage 2
System Limitation: OR Vehicle/System Faults.

In the above, "Double Paddle Declutch" refers to a condition in which a driver pulls both steering wheel mounted paddles simultaneously in a vehicle having paddle shifters. Also in the above example, as denoted by "OR", if any of the Stage 1 exit conditions are satisfied, the processing device exits Stage 1.

Figure 5:
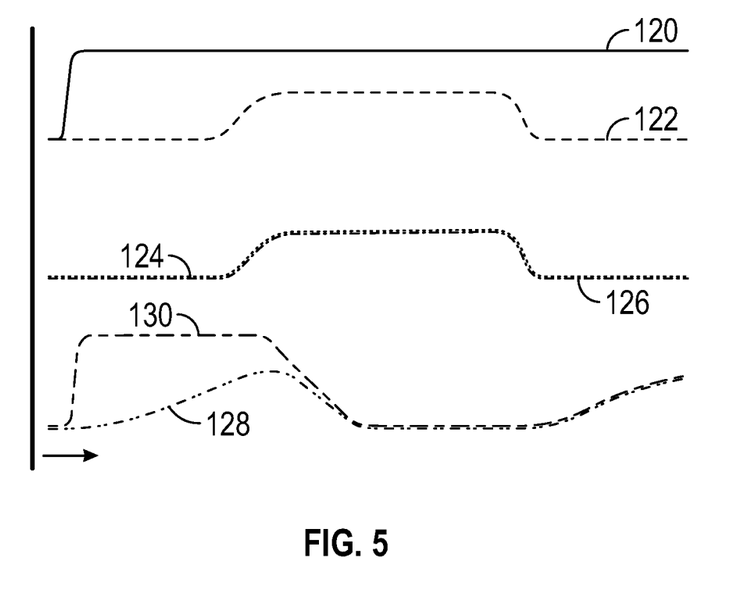
FIG. 5 depicts an example of operational parameters during a combined brake and propulsion maneuver, in conjunction with conventional braking control.
Figure 6:
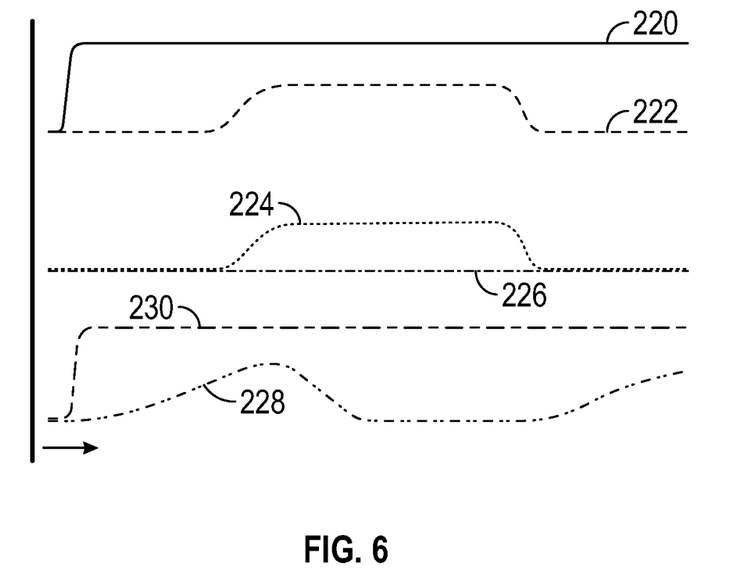
FIG. 6 depicts an example of operational parameters during a combined brake and propulsion maneuver, in conjunction with braking control in accordance with an exemplary embodiment.

FIG. 5 illustrates an example of vehicle operation according to normal braking modes during a combined braking and propulsion maneuver. FIG. 6 illustrates an example of vehicle operation according to the above embodiments during a combined braking and propulsion maneuver.

FIG. 5 shows values and changes of operating parameters during a combined brake and propulsion maneuver, under normal operation. Curve 120 corresponds to the accelerator pedal position, and curve 122 corresponds to the brake pedal position. Curves 124 and 126 show the front brake torque and rear brake torque, respectively. Lastly, curves 128 and 130 show the non-driven (front) average wheel speed and driven (rear) average wheel speed, respectively. As shown, during normal operation, the rear brake torque changes with the front brake torque, and interferes with the execution of a maneuver. Both front and rear wheel speeds are arrested, so that the rear wheels cannot spin as intended.

FIG. 6 shows values and changes of operating parameters during a combined brake and propulsion maneuver, when the vehicle is in the Stage 1 biasing mode. Curve 220 corresponds to the accelerator pedal position, and curve 222 corresponds to the brake pedal position. Curves 224 and 226 show the front brake torque and rear brake torque, respectively, and curves 228 and 230 show the front average wheel speed and rear average wheel speed, respectively. As shown, by using the biasing mode discussed herein, the rear brake torque remains at zero while the front brake torque increases and is maintained with respect to the brake pedal input. As such, the driver has independent control of the driven axle and front wheel speed, and can thereby more readily initiate and maintain the maneuver as intended.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for monitoring and controlling vehicle operation, comprising:
 a monitoring unit disposed at a vehicle, the vehicle including rear brakes and front brakes, the monitoring unit configured to monitor driver inputs, and automatically detect a driver's intention to perform a combined brake and propulsion maneuver based on the driver inputs meeting a first set of conditions; and
 a control unit configured to receive a brake request and an engine torque request from the driver during the maneuver, and based on detecting the first set of conditions, apply a front braking force via the front brakes according to the brake request, and automatically control a rear braking force applied by the rear brakes during the maneuver, so that the rear braking force is less than the front braking force, the control unit configured to monitor the driver inputs and vehicle conditions during the maneuver, and based on the driver inputs and the vehicle conditions meeting a set of entry conditions, return braking force to the rear brakes and limit engine torque to a level below a requested engine torque during the maneuver.

2. The system of claim 1, wherein the first set of conditions includes at least one of a vehicle speed being below a selected speed threshold, and the driver inputs include engagement of a brake pedal and an accelerator pedal in a selected sequence.

3. The system of claim 1, wherein the control unit is configured to maintain the front braking force at a level corresponding to a brake request from the driver inputs, and maintain the rear braking force at zero or within a selected range from zero.

4. The system of claim 1, wherein the control unit is configured to monitor the driver inputs during the maneuver, and compare the driver inputs to a second set of conditions corresponding to the driver's intention to end the maneuver.

5. The system of claim 4, wherein the control unit is configured to return the vehicle to a previous operating mode based on the driver inputs meeting the second set of conditions.

6. The system of claim 1, wherein the entry conditions are indicative of an unsafe condition of the vehicle.

7. The system of claim 6, wherein the set of entry conditions includes a speed of the vehicle being greater than a selected threshold.

8. The system of claim 1, wherein the entry conditions include a vehicle speed being above a selected threshold.

9. A method of monitoring and controlling vehicle operation, comprising:
 monitoring driver inputs to a vehicle, the vehicle including rear brakes and front brakes, and automatically detecting a driver's intention to perform a combined brake and propulsion maneuver based on the driver inputs meeting a first set of conditions;
 receiving a brake request and an engine torque request from the driver during the maneuver, and based on detecting the first set of conditions, applying a front braking force via the front brakes according to the brake request, and automatically controlling a rear braking force applied by the rear brakes during the maneuver, so that the rear braking force is less than the front braking force; and monitoring the driver inputs and vehicle conditions during the maneuver, and based on the driver inputs and the vehicle conditions meeting a set of entry conditions, returning braking force to the rear brakes and limiting engine torque to a level below a requested engine torque during the maneuver.

10. The method of claim 9, wherein the first set of conditions includes at least one of a vehicle speed being below a selected speed threshold, and the driver inputs include engagement of a brake pedal and an accelerator pedal in a selected sequence.

11. The method of claim 9, wherein the controlling includes maintaining the front braking force at a level corresponding to a brake request from the driver inputs, and maintaining the rear braking force at zero or within a selected range from zero.

12. The method of claim 9, further comprising monitoring the driver inputs during the maneuver, comparing the driver inputs to a second set of conditions corresponding to the driver's intention to end the maneuver, and returning the vehicle to a previous operating mode based on the driver inputs meeting the second set of conditions.

13. The method of claim 9, wherein the entry conditions are indicative of an unsafe condition of the vehicle.

14. The method of claim 9, wherein the entry conditions include a vehicle speed being above a selected threshold.

15. A vehicle system comprising:
   a memory having computer readable instructions; and
   a processing device for executing the computer readable instructions, the computer readable instructions controlling the processing device to perform:
      monitoring driver inputs to a vehicle, the vehicle including rear brakes and front brakes, and automatically detecting a driver's intention to perform a combined brake and propulsion maneuver based on the driver inputs meeting a first set of conditions;
      receiving a brake request and an engine torque request from the driver during the maneuver, and based on detecting the first set of conditions, applying a front braking force via the front brakes according to the brake request, and automatically controlling a rear braking force applied by the rear brakes during the maneuver, so that the rear braking force is less than the front braking force; and
      monitoring the driver inputs and vehicle conditions during the maneuver, and based on the driver inputs and the vehicle conditions meeting a set of entry conditions, returning braking force to the rear brakes and limiting engine torque to a level below a requested engine torque during the maneuver.

16. The vehicle system of claim 15, wherein the first set of conditions includes at least one of a vehicle speed being below a selected speed threshold, and the driver inputs include engagement of a brake pedal and an accelerator pedal in a selected sequence.

17. The vehicle system of claim 15, wherein the controlling includes maintaining the front braking force at a level corresponding to a brake request from the driver inputs, and maintaining the rear braking force at zero or within a selected range from zero.

18. The vehicle system of claim 15, wherein the processing device is further configured to perform monitoring the driver inputs during the maneuver, comparing the driver inputs to a second set of conditions corresponding to the driver's intention to end the maneuver, and returning the vehicle to a previous operating mode based on the driver inputs meeting the second set of conditions.

19. The vehicle system of claim 15, wherein the entry conditions are indicative of an unsafe condition of the vehicle.

20. The vehicle system of claim 15, wherein the entry conditions include a vehicle speed being above a selected threshold.

* * * * *